Nov. 18, 1924.
L. R. K. TALIAFERRO
1,515,978
DIRIGIBLE HEADLIGHT FOR AUTOMOBILES
Filed Oct. 17, 1922
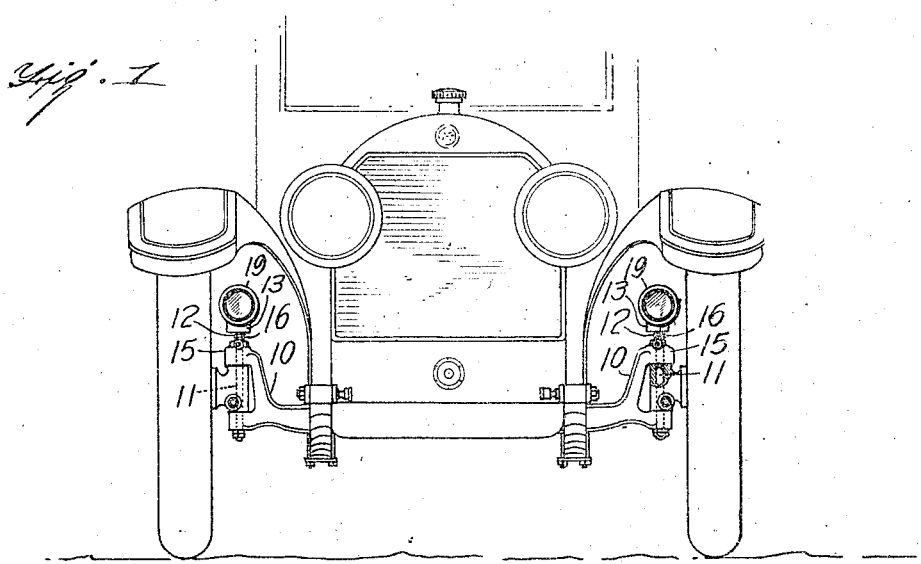
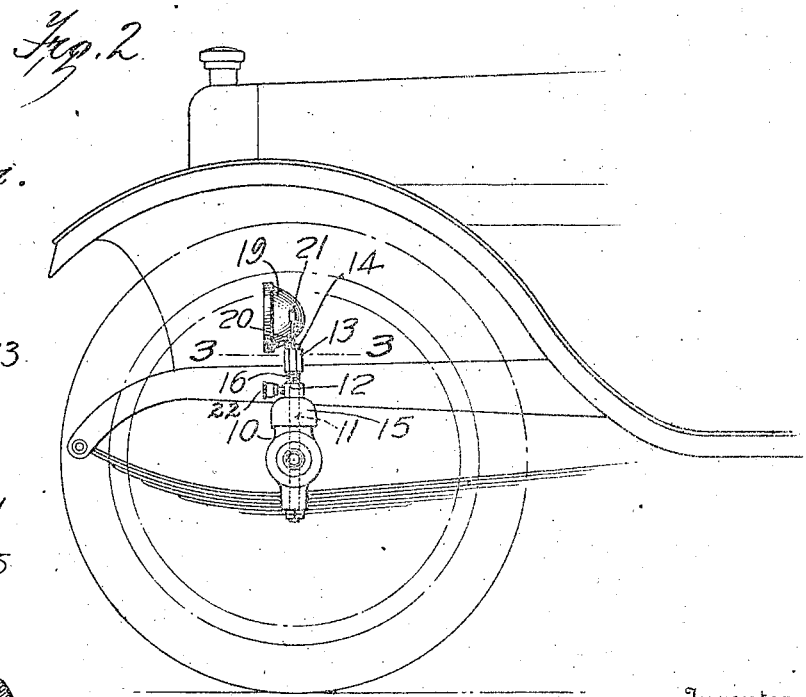
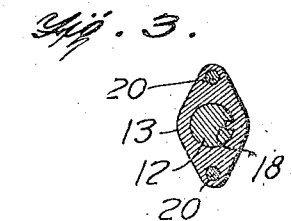
Inventor
LUCILE R. K. TALIAFERRO,
By
Attorney Patented Nov. 18, 1924.

1,515,978

UNITED STATES PATENT OFFICE.

LUCILE R. K. TALIAFERRO, OF NEW YORK, N. Y.

DIRIGIBLE HEADLIGHT FOR AUTOMOBILES.

Application filed October 17, 1922. Serial No. 595,195.

*To all whom it may concern:*

Be it known that I, LUCILE R. K. TALIAFERRO, residing at New York, county of New York, and State of New York, a citizen of the United States, have invented certain new and useful Improvements in Dirigible Headlights for Automobiles, of which the following is a specification.

My invention relates to motor vehicle lamps of the dirigible type. My object is to provide a construction which in the completest embodiment of my invention now known to me will combine the advantages of simplicity of construction, sturdiness, so that it will successfully withstand the shocks and jars to which such a structure is unavoidably subjected, ability to project the light over the road to the greatest possible advantage, and safety from accidental injury or damage. My invention consists in whatever construction is described by or included within the scope or meaning of the appended claims.

In the annexed drawings:

Fig. 1 is a front view of an automobile equipped with dirigible lamps embodying my invention;

Fig. 2 is a side elevation thereof the near wheel being omitted;

Fig. 3 is a horizontal section on the line 3—3 of Fig. 2;

Fig. 4 is a detail view in perspective of a portion of the structure.

Briefly described my invention embodies the idea of mounting an electric lamp directly upon the pivot or king pin of the knuckle of the steering gear and preferably upon each one thereof, the king pin or pivot being prolonged a few inches above the top of the knuckle to receive the lamp bracket, so that the lamp is comparatively low down and hence is most advantageously situated to project the light along the road and the lamp being situated beneath the arched top of the fender and between the side member of the fender and the adjacent wheel, is completely guarded or protected from injury from knocks or blows to which lamps situated in an exposed position are subject, and no perforation or alteration of the fender is needed as would be the case should the lamp be above the fender top.

Referring in detail to what is shown in the drawings the steering gear knuckle, 10, shown is of ordinary construction having a vertical pivot or king pin, 11, which above the top of the joint has an extension or prolongation, 12. Upon the latter is slipped the lamp bracket, 13, which is a simple cylindrical socket, the upper end of which is engaged by a nut, 14, which is screwed upon the threaded upper end of the king pin to confine the bracket in place. Between the lower end of the bracket sleeve and a shoulder on the upper knuckle bearing, 15, is a coil spring, 16, which forms a yielding support or shock absorber for the lamp. The lamp bracket and king pin are connected, as by means of a spline or key on the interior of the bracket sleeve, and a longitudinally extending groove or slot, 18, in the side of the king pin so that the lamp turns with the king pin and thus the light of the lamp is projected in the direction in which the car wheel is steered.

The lamp body, 19, is attached rigidly to the bracket sleeve by parallel vertical bolts, 20, which rise vertically from diametrically opposite side of the bracket, and which pass through eyes, 21, on opposite sides of the lamp body.

It will be seen that the lamp is supported in a position concentric with the king pin and therefore is supported in a balanced condition so that strains from jarring or vibration in the movement of the car will not be accelerated or increased as would be the case with an unbalanced or eccentric support of the lamp, and strains from vertical vibration are transmitted centrally and directly to the king pin and the knuckle bearing so that there are no parts apt to be bent or broken from vertical vibration.

The grease cup, 22, for the upper bearing, 15, serves to supply lubricant to the slidable bearing of the bracket sleeve upon the king pin, and thus insures the certain and easy vertical movement of the lamp under shocks or jars acting vertically.

What I claim is:

1. In combination with the steering mechanism of a motor car comprising a knuckle having an upper bearing and a pivot passing through such bearing and extending above the same a short distance, a symmetrical lamp supporting sleeve slidable upon said pivot extension and fixed thereto to rotate with such extension when the pivot is rotated in steering the car, a lamp mounted on said sleeve concentrically with said pivot, and a spring on which the sleeve rests.

2. In combination with the steering mechanism of a motor car comprising a knuckle having an upper bearing and a pivot passing through such bearing and extending above the same a short distance, a symmetrical lamp supporting sleeve slidable upon said pivot extension and fixed thereto to rotate with such extension when the pivot is rotated in steering the car, a lamp mounted on said sleeve concentrically with said pivot, a spring on which the sleeve rests, and a single means for lubricating the pivot bearing and the sleeve bearing.

3. In combination with the knuckle pivot of the steering mechanism of a motor car having an extension above the upper pivot bearing, a symmetrical lamp bracket sleeved upon such extension and slidable vertically thereon, a spring supporting such bracket, a nut on the pivot extension above the sleeve a pair of lamp supporting bolts rising from said bracket at diametrically opposite sides of the pivot and a lamp mounted on said bolts concentrically with the pivot.

In testimony whereof I hereunto affix my signature.

LUCILE R. K. TALIAFERRO.